United States Patent [19]

Toyoda

[11] 4,150,924
[45] Apr. 24, 1979

[54] ELECTROMAGNETIC PLUNGER PUMP

[75] Inventor: Akira Toyoda, Tokyo, Japan

[73] Assignee: Taisan Industrial Co., Ltd., Japan

[21] Appl. No.: 857,308

[22] Filed: Dec. 5, 1977

[30] Foreign Application Priority Data

Jun. 10, 1977 [JP] Japan ................................. 52/67854

[51] Int. Cl.² ............................................ F04B 49/00
[52] U.S. Cl. ..................................... 417/417; 417/366
[58] Field of Search ............................... 417/366, 417

[56] References Cited

U.S. PATENT DOCUMENTS

| | | | |
|---|---|---|---|
| 3,468,257 | 9/1969 | Kofink | 417/415 |
| 3,556,684 | 1/1971 | Rouquette | 417/417 |
| 3,874,822 | 4/1975 | Nakamura | 417/417 |
| 3,877,840 | 4/1975 | Nakamura | 417/417 |
| 3,877,841 | 4/1975 | Nakamura | 417/417 |
| 3,958,902 | 5/1976 | Toyoda | 417/417 |
| 4,021,152 | 5/1977 | Toyoda | 417/417 |

*Primary Examiner*—C. J. Husar
*Attorney, Agent, or Firm*—Kane, Dalsimer, Kane, Sullivan & Kurucz

[57] ABSTRACT

An electromagnetic plunger pump capable of keeping its delivery pressure substantially constant when the value of a voltage applied thereto remains in the range of values within the tolerance limits of variations. In this pump, spring constants of a restoring spring and an auxiliary spring are selected and the positions of an electromagnetic coil, an electromagnetic plunger and an annular magnetic pole are fixed such that there exists a relationship $0.1 < la/lb < 1$ between the distance lb between the magnetically neutral point of the electromagnetic coil and the magnetically neutral point of the electromagnetic plunger and the distance la between the upper end of the annular magnetic pole arranged below one end of the electromagnetic plunger and the lower end of the electromagnetic plunger. By this arrangement, it is possible to maintain the delivery pressure of the electromagnetic plunger pump in a stable range in spite of a variation in the value of the voltage applied thereto.

4 Claims, 12 Drawing Figures

FIG. 11-a
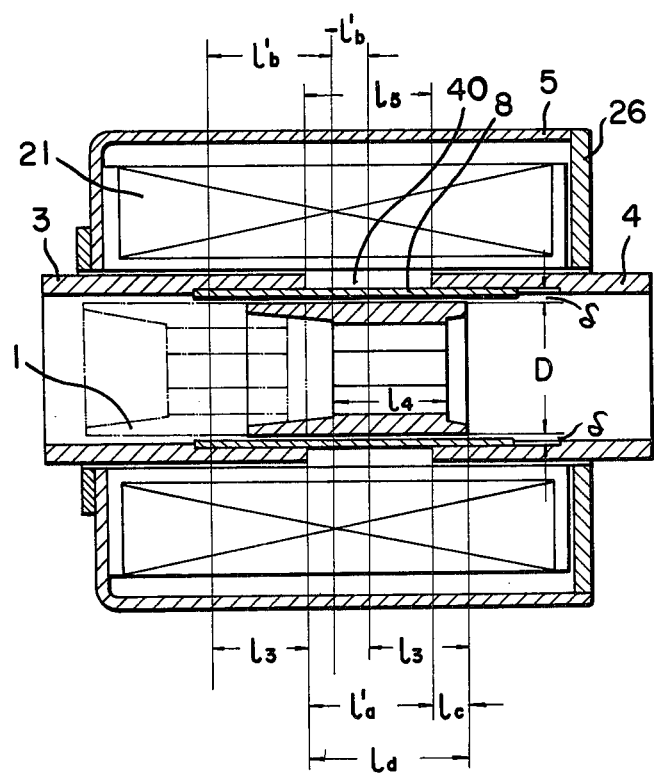

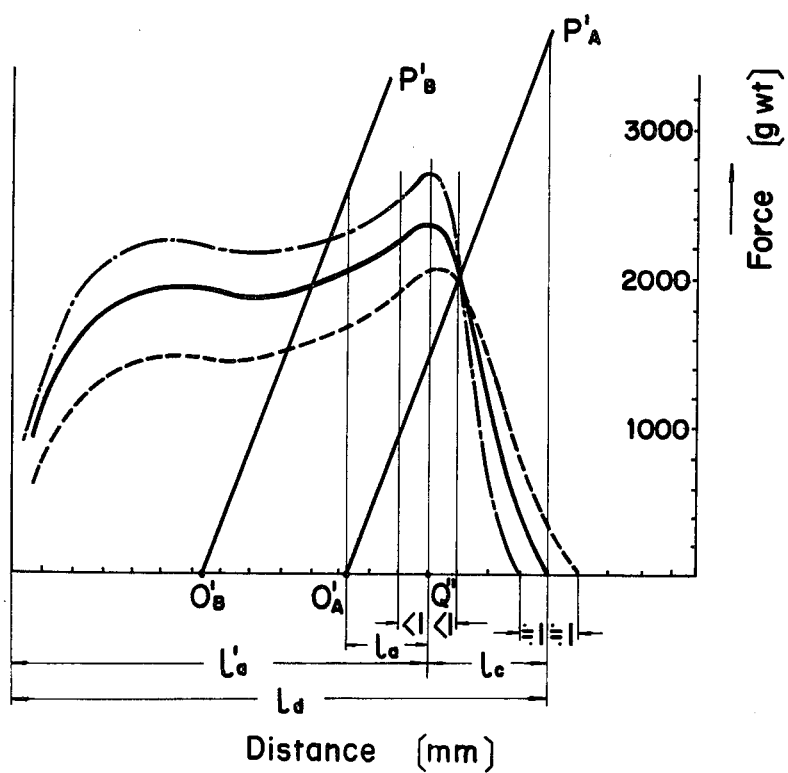
FIG. 11-b

ELECTROMAGNETIC PLUNGER PUMP

List of Prior Art References [37 CFR 1.56(a)]
The following references are cited to show the state of the art:
U.S. Pat. No. 4,021,152
U.S. Pat. No. 3,958,902
U.S. Pat. No. 3,877,841
U.S. Pat. No. 3,380,387
U.S. Pat. No. 3,468,257
U.S. Pat. No. 3,556,684
DT-OS No. 2,206,882

BACKGROUND OF THE INVENTION (1) Field of the Invention:

This invention relates to electromagnetic plunger pumps of the type whose delivery pressure is stabilized, and more particularly to an electromagnetic plunger pump which is capable of keeping its delivery pressure substantially constant when the value of a voltage applied thereto remains in the range of values within the tolerance limits of variations.

(2) Description of the Prior Art:

In electromagnetic plunger pumps of the prior art, a variation in the voltage of the power source has produced a change in their delivery pressure. For example, in an electromagnetic plunger pump of one type, variations in the voltage of the power source produce changes in its delivery pressure which are linear as shown in FIG. 1. More specifically, when the voltage of the power source shows a variation of ±15% with respect to a predetermined value, there is a change of about ±30% in the delivery pressure of the pump.

When a fluid, such as a fuel oil, is pressurized by a pump and ejected through a nozzle in atomized particles for combustion, the quantity of the fuel oil combusted or the quantity of the delivered fuel oil is proportional to the square root of the pressure. Therefore, a change of as high as ±30% of the aforementioned delivery pressure will result in a change in the quantity of the fuel oil combusted of about ±15%. The change of this degree is generally undesirable, so that there has been a demand for improving the performance of pumps.

Generally, electromagnetic plunger pumps are driven by power supplied from a commercially available AC power source and it often happens that a variation in voltage of the aforementioned degree is often caused by variations in other loads connected in parallel to the power transmission system for the commercial power source.

In order to keep substantially constant the delivery pressure of an electromagnetic plunger pump, several proposals have hitherto been made. One of such proposals involves the use of an electromagnetic plunger pump of a sufficiently high output not to cause a lowering of its delivery pressure from a predetermined range even if there occurs a reduction in voltage. Such pump is provided with a relief valve mechanism or a pressure control mechanism of the pressure-reducing valve type for suppressing the delivery pressure of the pump when the pump has a high pressure. In another proposal, an electromagnetic plunger pump is provided with a constant-voltage device which operates in combination with pump. In a further proposal, the magnetic path of the electromagnetic coil of an electromagnetic plunger pump is subjected to magnetic saturation so that the electromagnetic plunger may be actuated in a magnetically saturated condition.

Some disadvantages are associated with electromagnetic plunger pumps of these proposals. An electromagnetic plunger pump having a relief valve mechanism or a pressure control mechanism of the pressure-reducing valve type becomes complex in construction and a difficulty is encountered in effecting maintenance. Moreover, production cost is increased and the pump becomes large in size.

An electromagnetic plunger pump having a constant-voltage device has the disadvantage of its production cost becoming high. Therefore, an attempt has been made to use zener diodes to reduce the cost of production by taking the cost of production of a pump itself into consideration. However, in this case too, the price of a pump system inevitably becomes high. Moreover, in a system in which zener diodes are used for converting an AC current that has undergone half-wave rectification into a current of a trapezoidal wave form so as to thereby stabilize the voltage, it is possible to limit the value of the height of a sine wave of a power source current, but the width of the wave undergoes a change due to a change in the height of the wave as a whole which is caused by a variation in voltage. The result of this is that a mean value of the current varies at all times, so that a variation in the power source voltage is not satisfactorily compensated for.

In the system for magnetically saturating the magnetic path, it is necessary to keep the magnetizing force at a high level at all times, and this causes a rise in ampere-turn and a rise in the value of a current flowing into the coil. This results in a rise in temperature which makes it necessary to increase the size of the coil to cope with this situation. Thus, this system also increases production cost and the pump becomes large in size, so that the system is not economically acceptable.

SUMMARY OF THE INVENTION

An object of the present invention is to provide an electromagnetic plunger pump which is simple in construction and capable of stabilizing its delivery pressure readily and positively when there is a variation in power source voltage, by obviating the aforementioned disadvantages of the systems hitherto proposed for effecting stabilization of delivery pressure.

Another object is to provide an electromagnetic plunger pump in which the delivery pressure of the pump can be maintained substantially at a predetermined value without showing changes in the event of the occurrence of a variation in power source voltage, by regulating the relation between the solenoid attracting force exerted between the electromagnetic plunger and the electromagnetic coil and the attracting force produced in a gap between the electromagnetic plunger and an end of a magnetic pole without altering the construction of electromagnetic plunger pumps of the prior art, and by placing the electromagnetic plunger between two springs of properties commensurate with achieving the regulation of the aforesaid relation in such a manner that the electromagnetic plunger is maintained in pressing engagement with a delivery plunger in a balanced state.

Another object is to provide an electromagnetic plunger pump which is simple in construction, easy to maintain and handle, and stable in delivery pressure.

A further object is to provide an electromagnetic plunger pump which is small in size, low in cost, high in durability and stable in delivery pressure.

According to the invention, the electromagnetic plunger pump comprises an electromagnetic plunger which is coupled to a delivery plunger maintained in pressing engagement with each other in a balanced state by means of a restoring spring and an auxiliary spring. The spring constants of these two springs are selected such that the distance lb between the magnetically neutral point of an electromagnetic coil and the magnetically neutral point of the electromagnetic plunger and the distance la between an end of the electromagnetic plunger and an annular magnetic pole disposed in spaced juxtaposed relation to the electromagnetic plunger have a relationship $0.1 < la/lb < 1$. The pump according to the invention has a characteristic such that the delivery pressure shows a reduction in value when the electromagnetic plunger is moved toward the annular magnetic pole and the sum of deflections of the two springs is increased.

BRIEF DESCRIPTION OF THE DRAWINGS

FIG. 11-a is a sectional view of the magnetic path portion in explanation of the magnetic force exerted on the electromagnetic plunger in the electromagnetic plunger pump according to the invention; and FIG. 11-b is a graph showing the relation between the positions of the electromagnetic plunger as illustrated in FIG. 11-a and the forces acting thereon.

DESCRIPTION OF THE PREFERRED EMBODIMENT

The present invention will now be described in detail by referring to the accompanying drawings. Prior to describing in detail the electromagnetic plunger pump according to the invention, the characteristic of an electromagnetic plunger pump of the prior art will be described by referring to FIG. 2.

Figure 2:
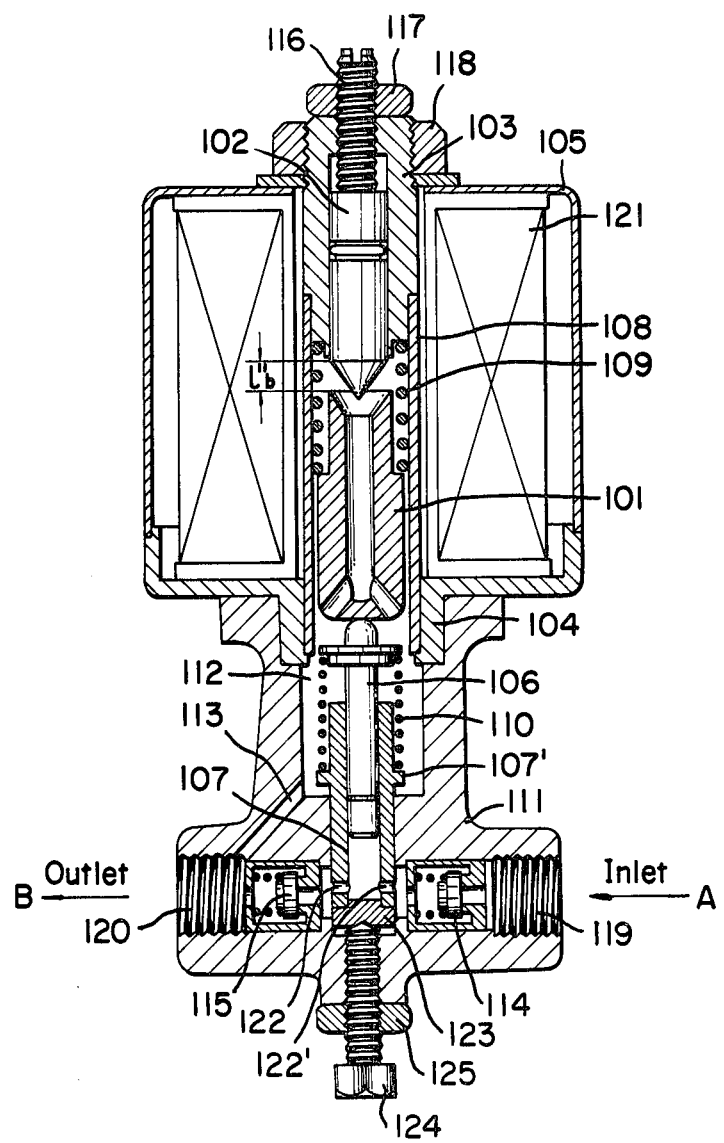
FIG. 2 is a vertical sectional view of an electromagnetic plunger pump of the prior art.

The electromagnetic plunger pump shown in FIG. 2 is essentially constructed such that a plunger case 108 of a non-magnetic material is inserted in an axial bore formed along the center axis of an electromagnetic coil 121 having a yoke consisting of a coil cover 105, a lower magnetic path 104 and an upper magnetic path 103, an electromagnetic plunger 101 is inserted in the plunger case 108 for reciprocatory sliding movement, and a magnetic head 102 is arranged at one end portion of the plunger case 108 (for sliding movement along the center axis of the upper magnetic path 103 to move up and down as shown) in spaced juxtaposed relation to the electromagnetic plunger 101. The magnetic attracting force acting on the electromagnetic plunger 101 is a composite magnetic attracting force consisting of a solenoid attracting force exerted by a magnetic flux penetrating the plunger case 108 and leaking to the plunger case 108 and an attracting force produced in a gap by the magnetic head 102.

The electromagnetic plunger 101 is disposed in abutting relation to a delivery plunger 106 inserted in a cylinder 107 located in a main body 111 for reciprocatory sliding movement, and the two plungers 101 and 106 are interposed between a restoring spring 109 mounted between the lower end of the upper magnetic path 103 and the plunger 101 and an auxiliary plunger 110 mounted between a flange 107' of the cylinder 107 and the upper end of the plunger 106, so that the two plungers 101 and 106 are maintained in a position in which they balance. If a current is passed to the electromagnetic coil 121, the magnetic attracting force referred to hereinabove will be produced to act on the electromagnetic plunger 101 to move the same upwardly in FIG. 2, thereby reducing the distance l"b between the magnetic head 102 and the electromagnetic plunger 101. This results in a compression of the restoring spring 109 and an expansion of the auxiliary spring 110. Upon the supply of the current being stopped, the magnetic attracting force ceases to exist and the electromagnetic plunger 101 is restored to its original position by the biasing force of the restoring spring 109. As the electromagnetic plunger 101 moves as aforesaid, the delivery plunger also makes one reciprocatory movement. By intermittently passing a current to the electromagnetic coil 121, the electromagnetic plunger pump operates such that a fluid is drawn by suction through an intake port 119 in the direction of an arrow A and flows through a check valve 114 on the suction side, ports 122 and 122' formed in the cylinder 107 and a check valve 115 on the delivery side to be discharged through an outlet port 120 in the direction of an arrow B. By turning an adjusting screw 116 mounted on the upper end of the magnetic head 102 in a manner to reduce the size of the magnetic gap l"b, it is possible to increase the delivery pressure of the pump. Conversely, if the size of the magnetic gap l"b is increased, then the delivery pressure of the pump is reduced. This is because the magnetic attracting force acting on the magnetic plunger 101 is in inverse proportion to the square of the magnetic gap l"b.

The delivery pressure of the pump can also be varied if the size of the magnetic gap l"b is adjusted by varying the deflections of the restoring spring 109 and the auxiliary spring 110 by turning an adjusting screw 124 airtightly screwed into the main body 111, after the cylinder 107 is positioned at its bottom on a seat 123.

Lock nuts 117 and 125 are mounted for fixing the adjusting screws 116 and 124 respectively. A nut 118 is mounted to threadably hold the coil cover 105 in place.

Figure 1:
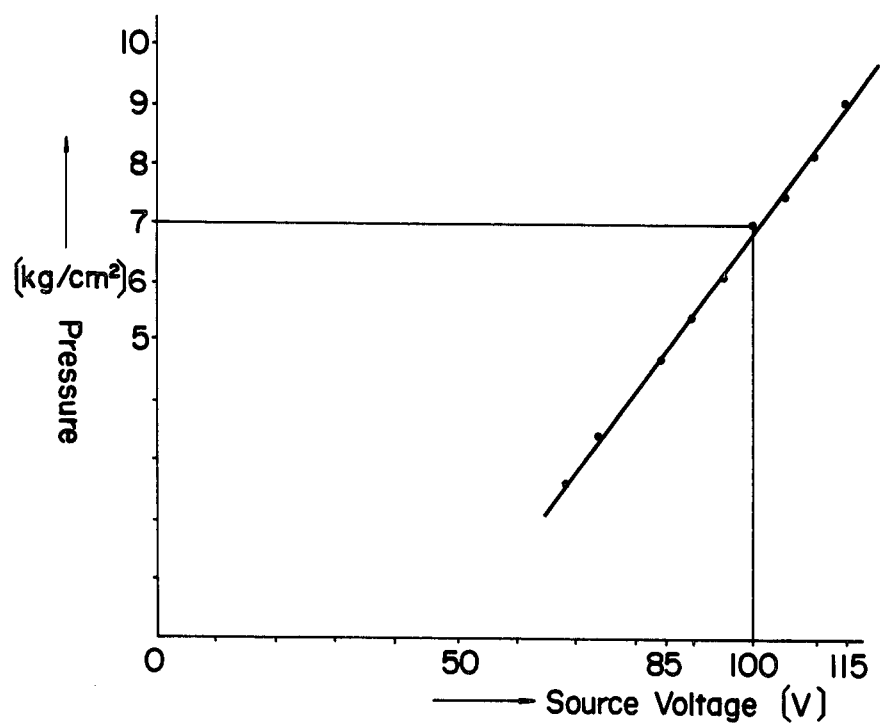
FIG. 1 is a graph showing the impressed voltage-delivery pressure characteristic of an electromagnetic plunger pump of the prior art.

The electromagnetic plunger pump of the prior art shown in FIG. 2 has a characteristic such that variations in the voltage impressed on the electromagnetic coil 121 produce great changes in delivery pressure as shown in FIG. 1. Thus it has hitherto been necessary to provide the electromagnetic plunger pump with the aforementioned various means for keeping substantially constant the delivery pressure of the pump in spite of variations in the impressed voltage.

Figure 3:
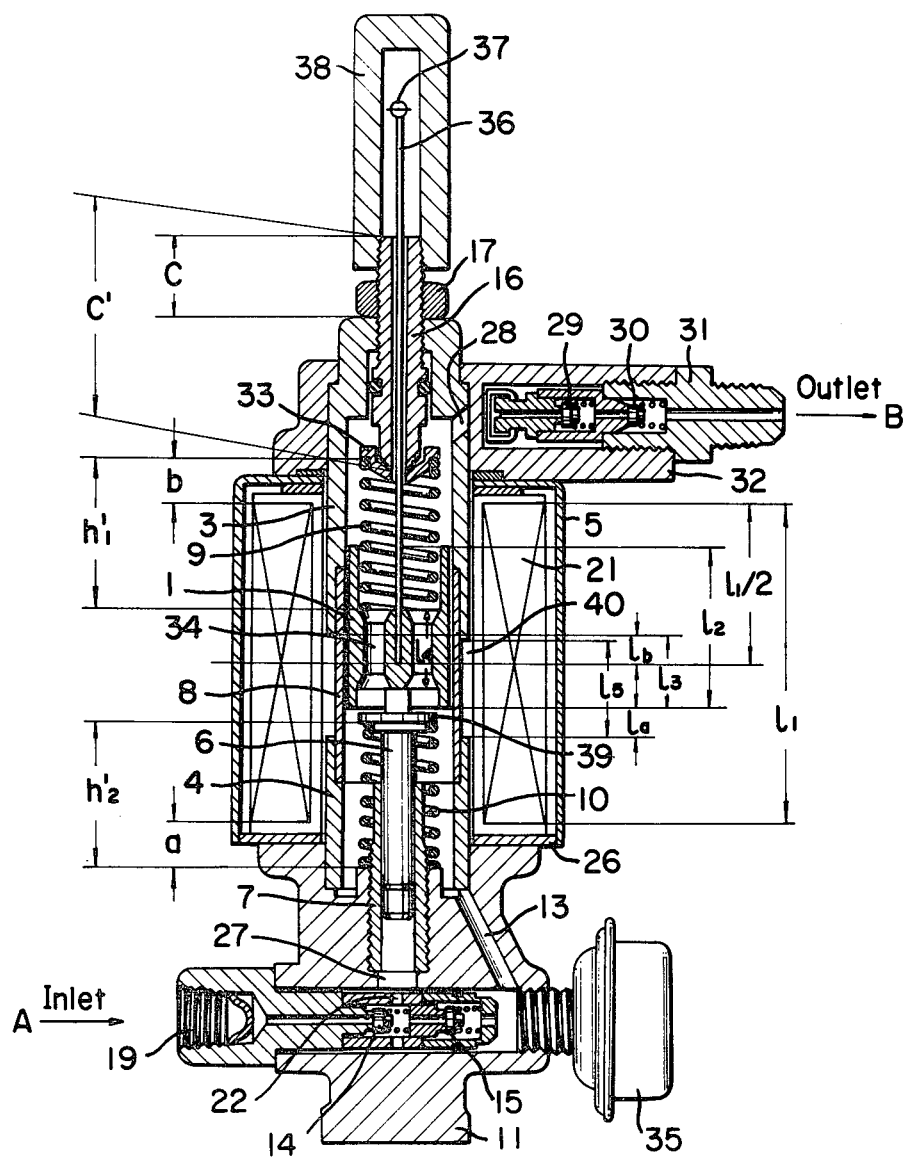
FIG. 3 is a vertical sectional view of the electromagnetic plunger pump comprising one embodiment of the invention.

FIG. 3 shows an electromagnetic plunger pump according to the present invention. The pump shown in FIG. 3 is provided with an indicating rod for the convenience of determining the position of the electromagnetic plunger in which is balances and remains stationary and the position thereof to which it moves during operation and measuring the stroke of the electromagnetic plunger, in explanation of the essentials of the present invention.

In the electromagnetic plunger shown in FIG. 3, a plunger case 8 is inserted in an axial bore formed along the center axis of an electromagnetic coil 21 and has an annular magnetic path 3 and an annular magnetic pole 4 fitted over the upper end portion of the lower end portion respectively thereof. A magnetic flux leaking portion 40 is formed between the annular magnetic path 3 and the annular magnetic pole 4, and a magnetic plunger 1 mounted in the plunger case 8 and located in the vicinity of the magnetic flux leaking portion 40 is reciprocatorily movable by the biasing forces of an auxiliary spring 9 and a restoring spring 10. The magnetic flux leaking portion 40 can be in the form of a gap or made of a non-magnetic material. A coil cover 5 surrounding the electromagnetic coil 21 and a lower plate 26 act as a yoke serving as a magnetic return path. A delivery joint 32 is secured on the coil cover 5 and communicates with the interior of the pump through a communicating port 28 in airtight relation. An adjusting rod 16 is threadably inserted in one end of the annular magnetic path 3 in airtight relationship and has attached to its lower end a spring seat 33 for mounting the auxiliary spring 9 between it and an electromagnetic plunger 1. The restoring spring 10 is mounted between a flange 38 of a delivery plunger 6 inserted in a cylinder 7 in a main body 11 for reciprocatory sliding movement and a spring seat provided in the main body 11, and maintained in abutting engagement with the electromagnetic plunger 1. The electromagnetic plunger 1 and the delivery plunger 6 are urged by the biasing forces of the two springs 9 and 10, which are equal in value and oriented in opposite directions, to move to a position in which they balance and remain stationary.

Upon passing a current to the electromagnetic coil 21, the electromagnetic plunger 1 is moved toward the annular magnetic pole 4 by the electromagnetic attracting force which is the composite force of a solenoid attracting force and an attracting force produced in the gap between the electromagnetic plunger 1 and the magnetic pole 4. As a result, the restoring spring 10 is compressed and the auxiliary spring 9 expands, causing the delivery plunger 6 to move downwardly. If the flow of the current to the coil 21 is stopped, the magnetic force disappears and the electromagnetic plunger 1 and the delivery plunger 6 are restored to their original positions by the biasing force of the restoring spring 10. Thus one reciprocating movement of the plungers is completed. Therefore, if an interrupted current is passed to the electromagnetic coil 21 as by subjecting a commercially available AC current to half-wave rectification, liquid will be introduced through an intake port 19 formed in the main body 11 and subjected to the action of a check valve 14 on the suction side. Then the liquid will pass through an opening 22 formed in the main body 11 and communicating with the cylinder 7 through a compression chamber 27, and is subjected to the action of a check valve 15 on the delivery side to flow through a duct 13 formed in the main body 11 into the plunger case 8, from which the liquid flows through a bore 34 formed in the electromagnetic plunger 1 and the communicating port 28 into the delivery joint 32. In the delivery joint 32, the liquid will be prevented from flowing backwardly by check valves 29 and 30 and discharged through a delivery member 31 threadably connected to the delivery joint 32. Thus the apparatus shown in FIG. 3 can perform a pumping operation.

The check valves 29 and 30 are provided to perform the following functions. When the pump is used to supply liquid to a liquid storage tank disposed at a level higher than that of the pump, they prevent water from leaking from the tank to the delivery side of the pump or prevent the occurrence of what is referred to as an after-flow phenomenon during the time the pump is shut down. When the pump is used for pressurizing a fuel oil and spraying the same in atomized particles into combustion equipment, these check valves can attain the end of throttling the flow of the fuel oil to delay a rise in pressure, in order to lower the delivery pressure to reduce the quantity of the fuel oil supplied and reduce the noise of explosion at the time of ignition of the fuel oil. These valves do not form a part of the invention. The numeral 35 designates an accumulator.

In causing the electromagnetic plunger pump of the type described to perform an expected operation by effectively utilizing a solenoid attracting force and an attracting force produced in the gap, the relative positions of the electromagnetic plunger 1 and the electromagnetic coil 21 and the length of the magnetic gap between the electromagnetic plunger 1 and the annular magnetic pole 4 play a very important role. The distance between the magnetically neutral point of the electromagnetic coil 21 which is the central point of the vertical axis of the electromagnetic coil 21 represented by $l\frac{1}{2}$ when the electromagnetic coil 21 as a length l1 and the magnetically neutral point which is disposed on the vertical axis of the electromagnetic plunger 1 and spaced apart from its lower end by a distance l3 (in case the shape is vertically symmetrical with respect to the magnetically neutral point, $l3 = l2/2$, if the length of the electromagnetic plunger 1 is denoted by l2) will be designated by lb. The distance between the lower end of the electromagnetic plunger 1 and the upper end of the annular magnetic pole 4 will be designated by la. If the free length and the compressed length of the auxiliary spring 9 is denoted by $h_1$ and $h'_1$, respectively and the free length and the compressed length of the restoring spring 10 are designated by $h_2$ and $h'_2$ respectively, then these two springs will hold the electromagnetic plunger 1 and delivery plunger 6 in a balanced position when the amounts of deflections which are in inverse proportion to their spring constants $K_1$ and $K_2$ are expressed by the following relation:

$$\frac{h_1 - h'_1}{h_2 - h'_2} = \frac{K_2}{K_1}.$$

The distances between the opposite ends of the electromagnetic plunger 21 to the spring seats of the two springs 10 and 9 are designated by a and b. If the length of the adjusting rod 16 is designated by c', the values of la and lb can be calculated by measuring the length c of the rod 16 extending upwardly from the upper end of the annular magnetic path 3 when the adjusting rod 16 is turned to adjust the length b.

In order to ascertain the values of la and lb obtained by calculation and to measure the positions and the lengths of the stroke of the reciprocating movement of the electromagnetic plunger 1 (including the delivery plunger 6 cooperating with the electromagnetic plunger 1), the spring seat 33 and adjusting rod 16 are formed therein with an axially extending bore in which an indicating rod 36 are inserted for reciprocatory movement. The indicating rod 36 is inserted in an secured to the electromagnetic plunger 1 at one end and mounts an indicator 37 at the other end. A transparent cap 38 which is cylindrical in form and has a bottom is applied to the threaded end of the adjusting rod 16 to provide a seal to the end of the adjusting rod. These parts constitute a measuring device for carrying out experiments. The lock nut 17 is for preventing the rotation of the adjusting rod 16.

Figure 4:
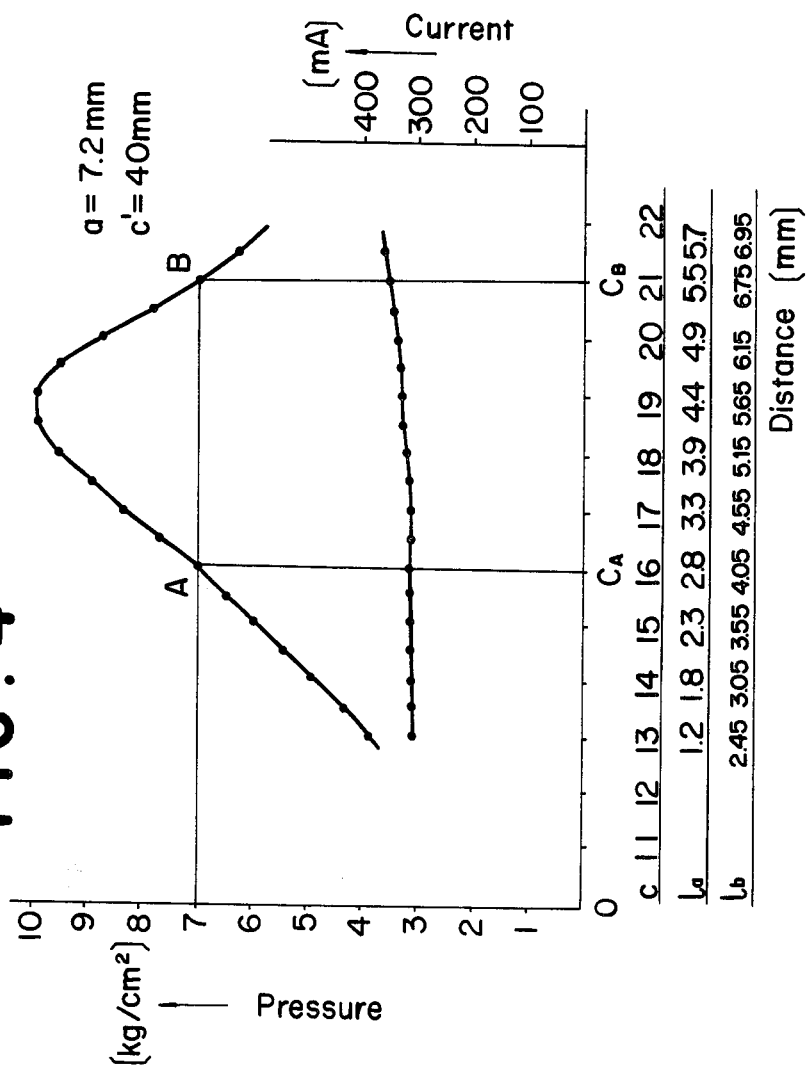
FIG. 4 is a graph showing the relation between the positions in which the electromagnetic plunger balances and remains stationary and the values of an electric current which is obtained when adjustments of the delivery pressure of the electromagnetic plunger pump according to the invention shown in FIG. 3 are effected.

Experiments were carried out by rotating the adjusting rod 16 to vary the length of c or the values of la and lb while applying to the electromagnetic coil 21 of this electromagnetic plunger pump a voltage obtained by subjecting an AC current of 50 Hz and 100 V to half-wave rectification and spraying kerosene under pressure in atomized particles at the rate of 1.5 gallons per hour. FIG. 4 shows the delivery pressure characteristic of the pump and the values of the current passed to the electromagnetic coil 21 when the values of la and lb were varied as aforesaid. The values of c, la and lb are set forth in mm along the horizontal axis, and the values of the delivery pressure and current are set forth in $kg/cm^2$ and mA respectively along the vertical axis. It will be seen in FIG. 4 that there are two points at which the pressure has the same value or 7 $kg/cm^2$. That is, there are two adjusted points of cA=16 mm and cB=21 mm, and the value of the current is slightly larger in the position of cB. At this time the value of a is constant or 7.2 mm.

Figure 5:
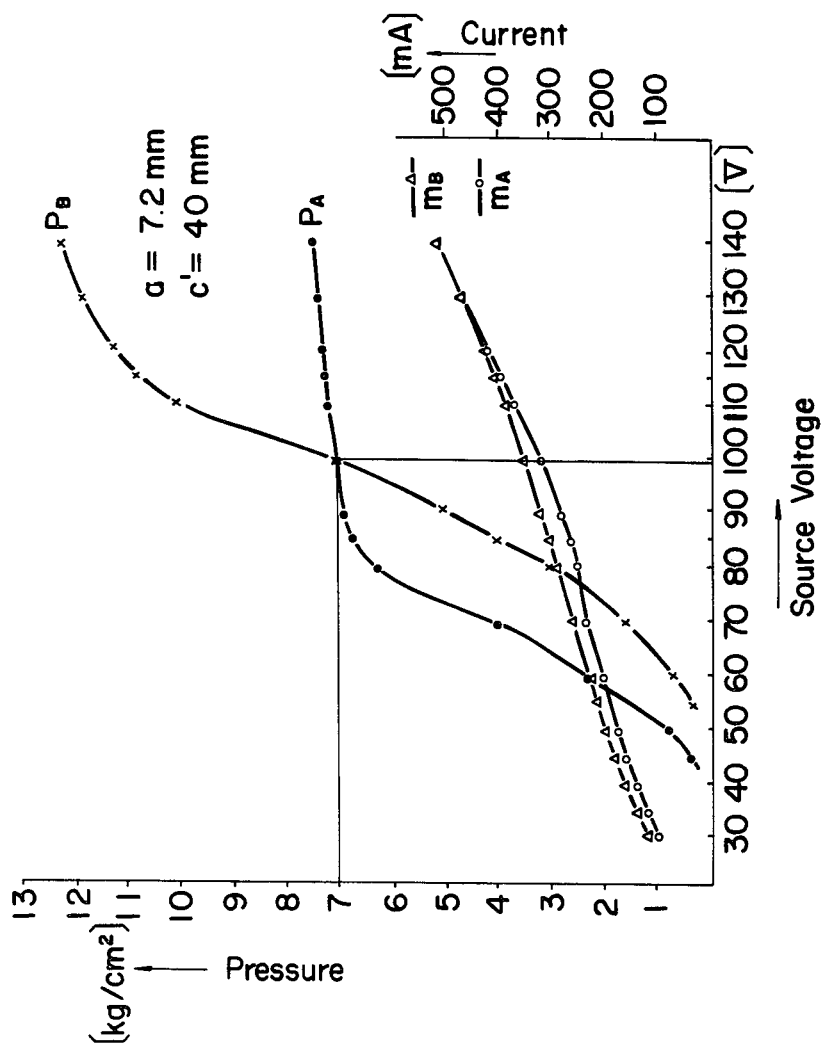
FIGS. 5, 6 and 8 are graphs showing the voltage-delivery pressure characteristic of the electromagnetic plunger pump according to the invention.

FIG. 5 shows the voltage-delivery pressure characteristic and the voltage-current characteristic of the pump obtained when cA=16 mm and cB=21 mm at the time the adjusting rod 16 was rotated to adjust the value of c and set delivery pressure of the pump at 7 $kg/cm^2$. The values of the voltage V impressed on the electromagnetic coil 21 are set forth along the horizontal axis and the delivery pressure p $kg/cm^2$ and the values of the current mA passed to the electromagnetic coil are set forth along the vertical axis.

In FIG. 5, thick solid curves represent a characteristic exhibited when the pump was set at cA and thin solid curves represent a characteristic exhibited when it was set at cB. It will be seen that when the pump was set at cB, the delivery pressure increased substantially in proportion to an increase in the voltage impressed on the electromagnetic coil in the same manner as in conventional electromagnetic plunger pump, but when the pump was set at cA, variations in delivery pressure were very small and the delivery pressure was substantially stable when the voltage impressed on the electromagnetic coil exceeded 85 V. Also, when the pump was set at cB, the delivery pressure showed a tendency to increase as shown in FIG. 4 as the sum of deflections of the restoring spring 10 and the auxiliary spring 9 was increased to move the electromagnetic plunger 1 nearer to the annular magnetic pole 4. However, when the pump was set at cA, the delivery pressure decreased as the sum of deflections of the restoring spring 10 and the auxiliary spring 9 was increased to move the electromagnetic plunger nearer to the annular magnetic pole 4. This is a tendency which is contrary to the tendency shown by conventional electromagnetic plunger pumps. The aforementioned method of use of the restoring spring 10 and the auxiliary spring 9 constitutes one of the marked differences between the electromagnetic plunger pump according to the invention and conventional electromagnetic plunger pumps. Also, the numerical relation between la and lb is an important factor.

The relation between the values of the voltage and current applied to the electromagnetic coil is such that they are proportional to each other substantially linearly. The values of the current are slightly higher when the pump is set at cB.

Figure 6:
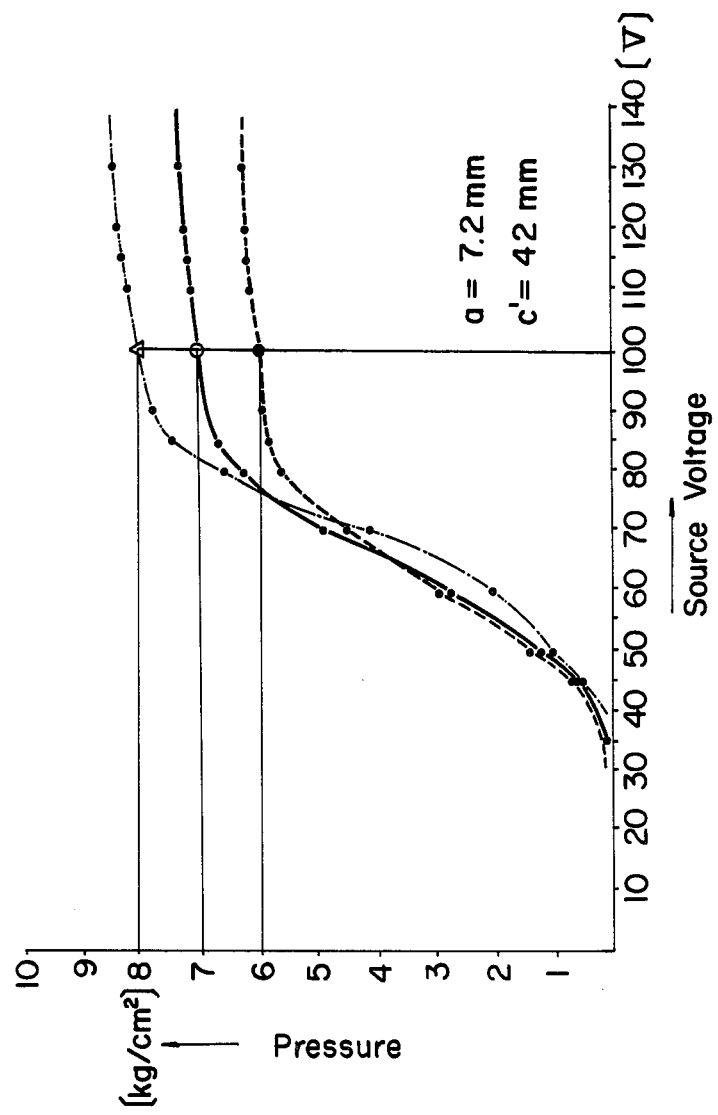
Figure 7:
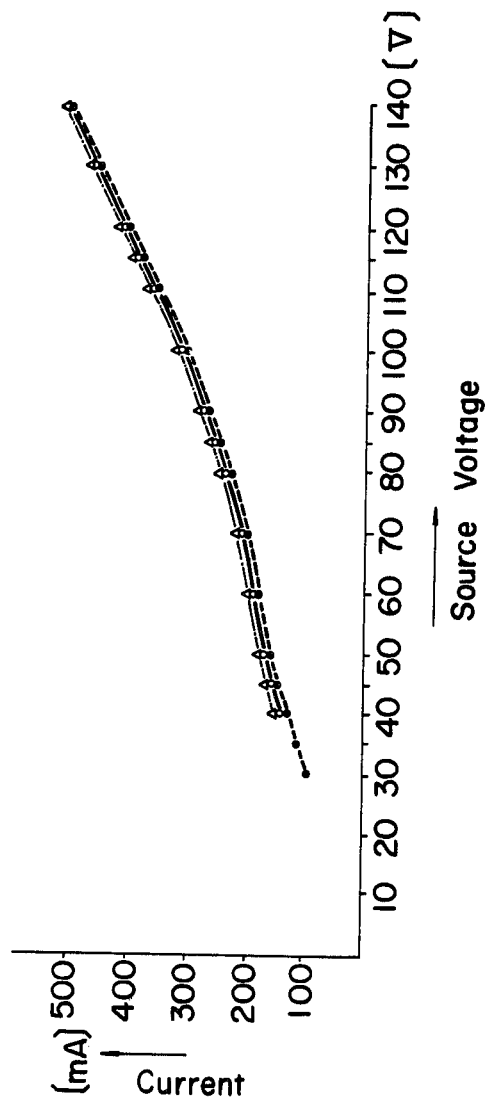
FIGS. 7 and 9 are graphs showing the relation between the voltage and the current of the electromagnetic plunger pump according to the invention when the pump has the characteristic shown in FIGS. 6 and 8 respectively.
Figure 8:
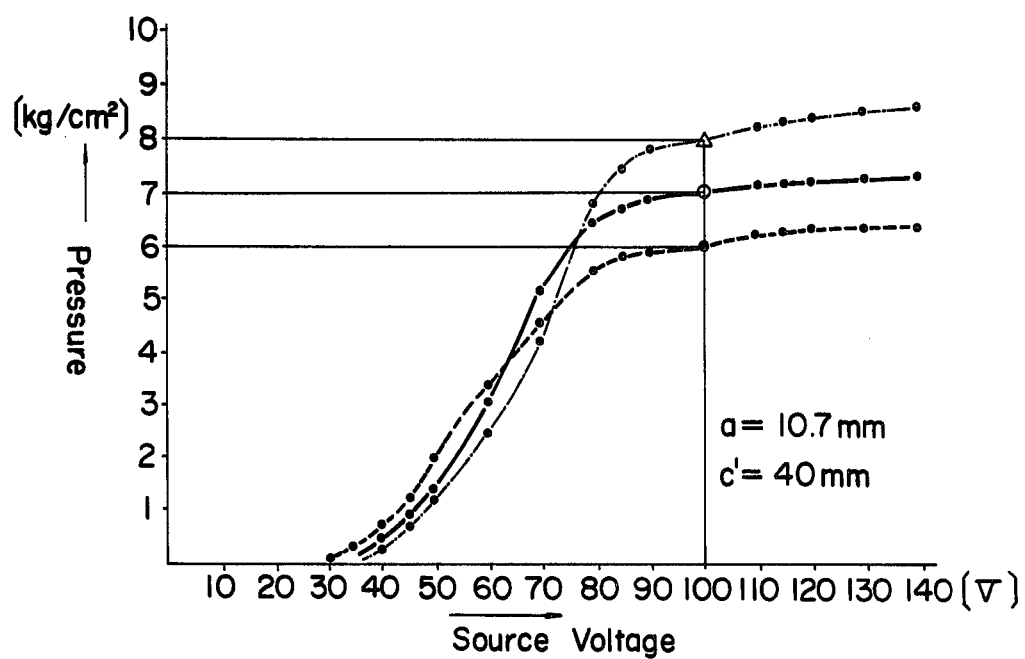
Figure 9:
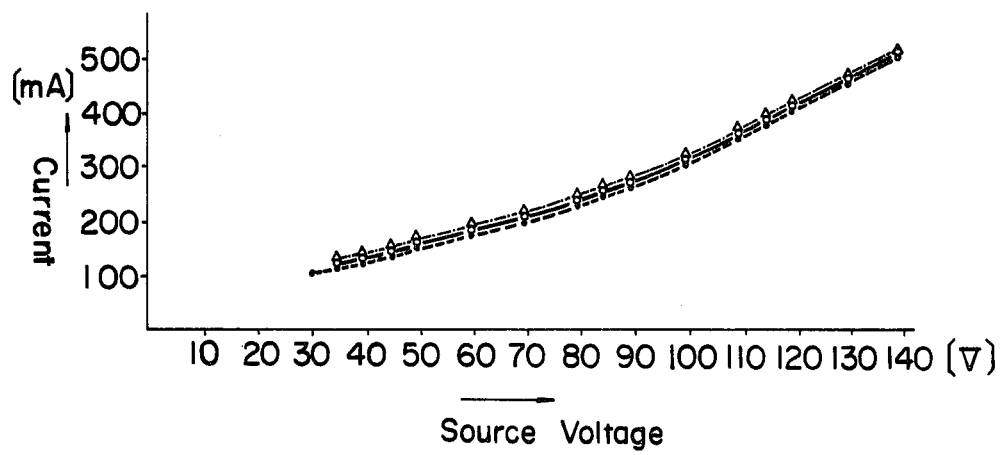

FIGS. 6 and 8 show the voltage-delivery pressure characteristic of a pump of the same condition obtained when the delivery pressure was varied to 6 $kg/cm^2$, 7 $kg/cm^2$ and 8 $kg/cm^2$ while an AC current of 50 Hz and 100 V was passed to the electromagnetic coil, by varying the values of c after the sum of deflections of the restoring spring 10 and the auxiliary spring 9 was increased to move the electromagnetic plunger 1 toward the annular magnetic pole 4 so as to bring the pump to a condition in which their delivery pressure decreases. It is added that in FIG. 6 the value of a is 7.2 mm and in FIG. 8 the corresponding value is 10.7 mm with other conditions being equal. FIGS. 7 and 9 show the values of the current mA flowing to the electromagnetic coil in relation to the values of the voltage V in the pump of FIGS. 6 and 8. In FIGS. 6 to 9, a broken line curve, a solid line curve and a dash-and-dot line curve represent changes occurring when the pressure is set at 6 $kg/cm^2$, 7 $kg/cm^2$ and 8 $kg/cm^2$ respectively.

From the graphs shown in FIGS. 6 to 9, it will be seen that the delivery pressure is substantially stable when the voltage changes by ±15% above or below 100 V. It will also be seen that the values of the current vary substantially in linear proportion to changes in the values of the voltage. The voltage-delivery pressure characteristic is such that it shows no change even if the quantity of the liquid emitted through the nozzle is varied, except for the fact that it shows changes when the adjusting rod 16 is turned in a direction in which the value of c is reduced. On the contrary, the delivery pressure tends to become stable more and more. This is true when the pump is set at a lower delivery pressure. However, when it is necessary to greatly increase the quantity of the liquid ejected through the nozzle or to increase the delivery pressure of the pump, a tendency opposite to the aforementioned tendency will occur. Therefore, it goes without saying that it is necessary to vary the specifications of the electromagnetic plunger pump or to alter the design of the electromagnetic coil, electromagnetic plunger and the delivery plunger when the necessity referred to above is experienced.

After conducting a series of experiments, it has been ascertained that the voltage-delivery pressure characteristic of the pump can be stabilized if the values of la and lb and their ratio are maintained in certain ranges.

Table 1 shows the results of the experiments.

Table 1

| No. | a' (mm) | c' (mm) | c (mm) | $h_1 - h'_1$ (mm) | $h_2 - h'_2$ (mm) | la (mm) | lb (mm) | la/lb | 50 Hz 100 V 1.5 G/h nozzle Pressure (kg/cm²) | Current (mA) | 50 Hz 100 V Outlet port closed Pressure (kg/cm²) | Current (mA) | Voltage-delivery pressure stability |
|---|---|---|---|---|---|---|---|---|---|---|---|---|---|
| 1 | 7.2 | 42 | 15 | 9.4 | 10.6 | 1.2 | 2.45 | 0.49 | 4.0 | 310 | 4.8 | 314 | ○ |
| 2 | " | " | 16 | 9.0 | 10.0 | 1.8 | 3.05 | 0.59 | 5.0 | 312 | 5.6 | 315 | ○ |
| 3 | " | " | 17 | 8.5 | 9.5 | 2.3 | 3.55 | 0.65 | 6.1 | 316 | 6.7 | 318 | ○ |
| 4 | " | " | 18 | 8.0 | 9.0 | 2.8 | 4.05 | 0.69 | 7.1 | 320 | 7.65 | 325 | ○ |
| 5 | " | " | 19 | 7.5 | 8.5 | 3.3 | 4.55 | 0.73 | 8.3 | 322 | 9.3 | 328 | ○ |
| 6 | " | " | 20 | 7.1 | 7.9 | 3.9 | 5.15 | 0.76 | 9.2 | 324 | 10.3 | 334 | △ |
| 7 | " | " | 21 | 6.6 | 7.4 | 4.4 | 5.65 | 0.78 | 9.8 | 328 | 11.2 | 337 | × |
| 8 | " | " | 21.5 | 6.4 | 7.1 | 4.7 | 5.95 | 0.79 | 10.0 | 330 | 11.6 | 342 | × |
| 9 | " | 40 | 13 | 9.4 | 10.6 | 1.2 | 2.45 | 0.49 | 3.8 | 310 | 4.6 | 312 | ○ |
| 10 | " | " | 14 | 9.0 | 10.0 | 1.8 | 3.05 | 0.59 | 4.9 | 312 | 5.6 | 314 | ○ |
| 11 | " | " | 15 | 8.5 | 9.5 | 2.3 | 3.55 | 0.65 | 6.0 | 316 | 6.6 | 316 | ○ |
| 12 | " | " | 16 | 8.0 | 9.0 | 2.8 | 4.05 | 0.69 | 7.0 | 320 | 7.6 | 324 | ○ |
| 13 | " | " | 17 | 7.5 | 8.5 | 3.3 | 4.55 | 0.73 | 8.2 | 324 | 9.2 | 327 | ○ |
| 14 | " | " | 18 | 7.1 | 7.9 | 3.9 | 5.15 | 0.76 | 9.4 | 328 | 10.4 | 334 | △ |
| 15 | " | " | 19 | 6.6 | 7.4 | 4.4 | 5.65 | 0.78 | 9.8 | 330 | 11.4 | 338 | × |
| 16 | " | " | 20 | 6.1 | 6.9 | 4.9 | 6.15 | 0.80 | 8.7 | 340 | 9.7 | 350 | × |
| 17 | " | " | 21 | 5.7 | 6.3 | 5.5 | 6.75 | 0.81 | 7.0 | 350 | 7.6 | 360 | × |
| 18 | " | " | 21.5 | 5.4 | 6.1 | 5.7 | 6.95 | 0.82 | 6.3 | 360 | 6.7 | 367 | × |
| 19 | " | 43 | 19.0 | 8.0 | 9.0 | 2.8 | 4.05 | 0.69 | 7.0 | 320 | 7.7 | 325 | ○ |
| 20 | " | " | 22.5 | 6.4 | 7.1 | 4.7 | 5.95 | 0.79 | 9.9 | 330 | 11.3 | 340 | × |
| 21 | 9.2 | 43 | 20.5 | 6.4 | 7.1 | 2.7 | 3.95 | 0.68 | 6.9 | 320 | 7.5 | 324 | ○ |
| 22 | 10.7 | 40 | 15 | 6.8 | 7.7 | 0.6 | 1.85 | 0.32 | 3.3 | 310 | 4.3 | 310 | ○ |
| 23 | " | " | 16 | 6.4 | 7.1 | 1.2 | 2.45 | 0.49 | 4.1 | 310 | 5.0 | 314 | ○ |
| 24 | " | " | 17 | 5.9 | 6.6 | 1.7 | 2.95 | 0.58 | 4.9 | 312 | 5.7 | 316 | ○ |
| 25 | " | " | 18 | 5.4 | 6.1 | 2.2 | 3.45 | 0.64 | 6.0 | 316 | 6.8 | 318 | ○ |
| 26 | " | " | 19 | 5.0 | 5.5 | 2.8 | 4.05 | 0.69 | 6.9 | 320 | 7.6 | 324 | ○ |
| 27 | " | " | 20 | 4.5 | 5.0 | 3.3 | 4.55 | 0.73 | 8.1 | 322 | 9.2 | 326 | ○ |
| 28 | " | " | 21 | 4.0 | 4.5 | 3.8 | 5.05 | 0.75 | 9.0 | 326 | 10.4 | 334 | △ |
| 29 | " | " | 21.5 | 3.8 | 4.2 | 4.1 | 5.35 | 0.77 | 9.45 | 328 | 10.6 | 336 | △ |

Table 1 shows that even if the distance a between the lower end of the electromagnetic plunger 21 and the seat of the restoring spring 10 and the length c' of the adjusting rod 16 are varied, it is possible to adjust and set the values of la and lb to substantially constant ranges by adjusting the value of c, and that the voltage-delivery pressure characteristic of the pump is stabilized at this time. The delivery pressure of the pump is such that it is the same as the delivery pressure required for ejecting kerosene under pressure through a nozzle in atomized particles at the rate of 1.5 gallons per hour as mentioned above. The term "pressure with outlet port closed" refers to a pressure which prevails when the outlet side is closed. It will be noted that in some cases the values of current passed to the electromagnetic coil are slightly greater when the outlet side is closed than when the oil is emitted in atomized particles. It appears that when the outlet end is closed, the electromagnetic plunger 1 remains substantially stationary in a position in which it is slightly spaced from the annular magnetic pole 4, with the result that the magnetic gap is slightly larger in size and the current flows in a larger value. However, there is no great difference in the value of the current flowing to the coil between the time during which the outlet end is closed and the time during which the oil is emitted in atomized particles as shown in Table 1, as contrasted to the differences in the values of current which occur when an AC current is used, and the value of the current is considered substantially constant. The values of lb and la have been calculated as described above. It is possible to confirm the values of la and lb on the basis of the measurements of the position of the indicator 37.

Then, an experiment was conducted to measure the position of the reciprocatory movement of the electromagnetic plunger 1 and the length of the stroke thereof by measuring the movement of the indicator 37 by utilizing a stroboscope, when cA was at the adjusted position of 16 mm or la≈2.8 mm and lb≈4.05 mm at which the voltage-delivery pressure characteristic is most stabilized as the oil is emitted through the nozzle at the rate of 1.5 gallons per hour as aforementioned. The results reveal that when the oil is delivered at the delivery pressure of 7 kg/cm², the lower end of the electromagnetic plunger 1 moves downwardly to the position of the upper end of the annular magnetic pole 4 or by a distance of 2.8 mm and moves in reciprocatory movement for a distance of about ≦1 mm upwardly and downwardly or with a stroke of about ≦2 mm from said position. At this time, the flow rate of the delivered oil was $(3,780 \times 1.5 \times \eta) = 5,400$ cc/hour. The delivery plunger 6 has a diameter of 5 mm and moves in reciprocating movement at a rate of 50 times per second, so that the length of the stroke thereof can be calculated as follows:

$$\frac{5400}{60 \times 60 \times 50 \times \frac{\pi 0.5^2}{4}} \approx 1.5 \text{ mm}$$

It is due to the influences of oil leaking from between the plunger 6 and cylinder 7, the valving efficiency of the suction valve and discharge valve and the compressibility of the gas contained in the kerosene that the length of the stroke actually measured is slightly larger than the length of the stroke obtained by calculation, and that there is a slight variation which is about ≦2 mm. If the nozzle is removed from the delivery end of the pump, the operating position of the electromagnetic plunger 1 is such that it has a length of stroke of about 6 mm which can be divided into about 1 mm upwardly of the balanced stationary position and about 5 mm downwardly therefrom. At this time, the flow rate of the delivered oil is 18.5 l per hour. This value is substantially in agreement with the value obtained by calculation performed in the manner mentioned above. It is to be noted that the top dead center of the length of the stroke extends upwardly by about 1 mm above the balanced stationary position. This is due to the energy of inertia of the mass of the restoring spring 10 to which the electromagnetic plunger 1 is subjected in the return stroke. It is what distinguishes the electromagnetic plunger pump according to the invention over electromagnetic plunger pumps of the prior art that the bottom dead center of the length of the stroke of the electromagnetic plunger 1 is disposed in a position which is only about 1 mm lower than the upper surface of the annular magnetic pole 4, irrespective of whether the pump has a high delivery pressure with a nozzle mounted at its delivery end or the pump has a low delivery pressure because its delivery end is open.

The relation between the position of the electromagnetic plunger and the stroke thereof in magnetic plunger pumps having an annular magnetic pole of this type is described in the publications known in this field, such as Japanese Utility Model Publication No. Sho 42-16698 entitled "Vibration-Type Electromagnetic Apparatus" and Japanese Patent Publication No. Sho 48-25563 entitled "Improvements in Electric Motors", particularly in Japanese Laid-Open Patent Application No. Sho 51-60002 entitled "Electromagnetic-Type Plunger Pump". In these publications, it is described that changes in the magnetic attracting force take place slowly with respect to changes in the position of the electromagnetic plunger, and that a relatively stable flow rate can be obtained as compared with pumps of the prior art even if the input voltage to the electromagnetic coil is reduced. A comparison of FIGS. 4 and 5 shows that the electromagnetic attracting force is less than about 1.5 kg when the voltage impressed has a normal value, and the mean value of the electromagnetic attracting force is reduced by half, with the value being 0.7 to 1 kg when the impressed voltage is reduced to 70% in value. This will cause a marked reduction in delivery pressure and such pumps will not be suitable for practical use if it is required to maintain the delivery pressure at about 7 kg/cm$^2$ at all times and to stabilize the delivery pressure as is the case with the pump of this application.

Figure 10:
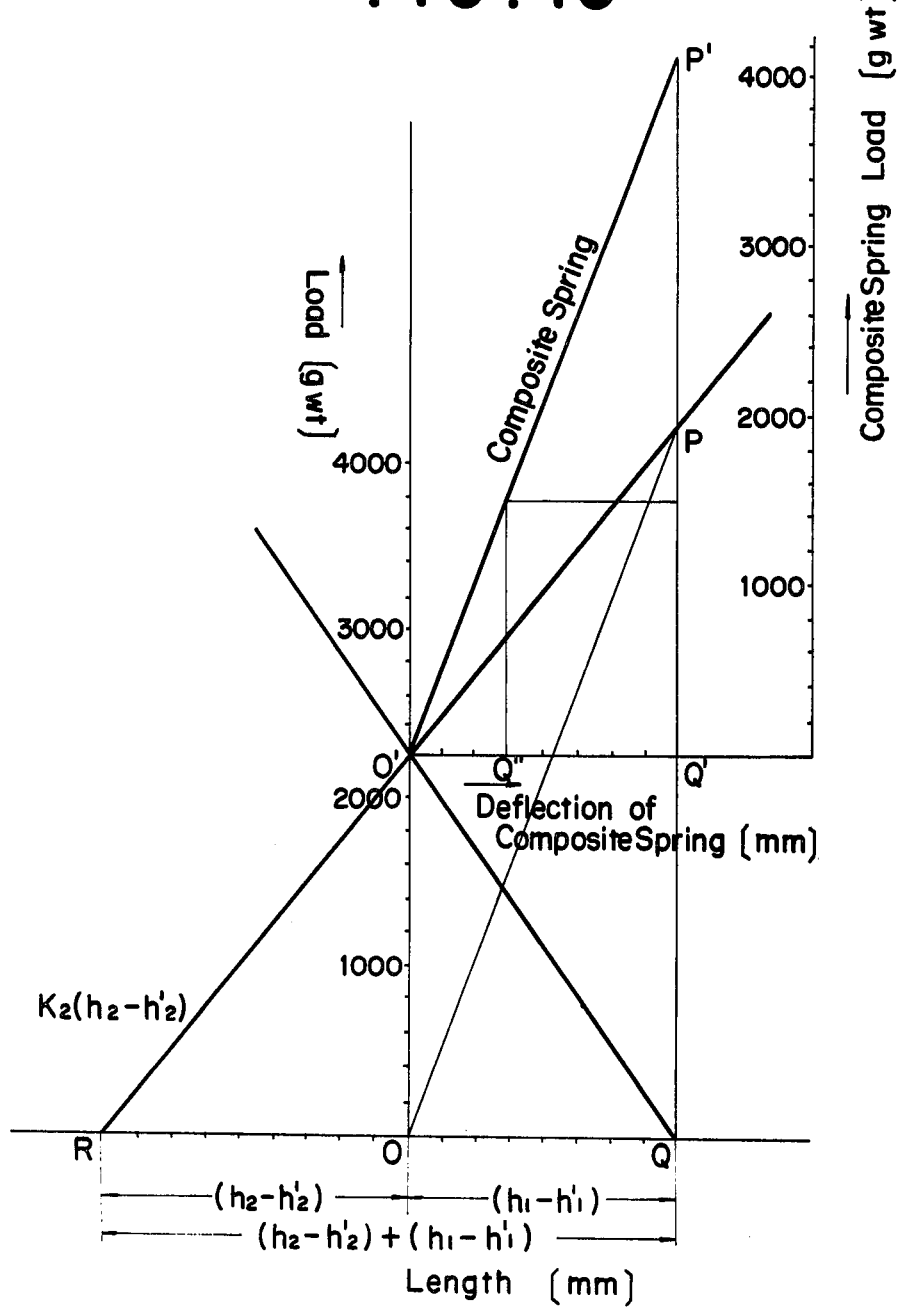
FIG. 10 is a graph showing the relation between the contraction of the composite spring of the electromagnetic plunger according to the invention and the load.

In this invention, the magnetic attracting force has a linear relation with respect to the relative positions of the electromagnetic plunger and the electromagnetic coil and the position of the gap between the electromagnetic plunger and the annular magnetic pole. The sume of the solenoid attracting force and the attracting force produced in the gap increases in a sharp curve. Before describing this phenomenon, the deflection and load of a so-called composite spring consisting of the restoring spring and the auxiliary spring acting in accordance with the magnetic attracting force will be described with reference to FIG. 10. In FIG. 10, a point Q representing the deflection (h$_1$-h'$_1$)mm of the auxiliary spring when the delivery pressure of the pump is adjusted to 7 kg/cm$^2$ by the adjusting rod is set forth along the horizontal axis rightwardly of a point O, and a point R representing the deflection (h$_2$-h'$_2$) mm of the restoring spring is set forth leftwardly of the point O.

Let the spring constants of the two springs be designated by K$_1$ and K$_2$ respectively. Then, as described above, a load of K$_1$(h$_1$-h'$_1$)=K$_2$(h$_2$-h'$_2$) is set forth at a point O' on a line perpendicular to the point O, points Q and O' and R and O' are connected, and an intersection P of an extension of the line RO' and a line perpendicular to the point Q is connected. A line parallel to the line OP is drawn from the point O' so that it intersects an extension of the line Q'P at a point P'. The points O' and P' are connected. The line O'P' represents the deflection-load characteristic of the composite spring. If the electromagnetic plunger which remains balanced and stationary at point O' as it is subjected to the biasing forces of the two springs which are equal in intensity but oriented in opposite directions is moved by the magnetic attracting force toward the annular magnetic pole, then the restoring spring is compressed and its deflection is increased, so that its load is increased. On the other hand, the auxiliary spring expands and its deflection is reduced, so that its load is reduced. Thus the relative load applied to the composite spring is increased. That is, the electromagnetic plunger is balanced when a change in the load with respect to the deflection and a change in the magnetic attracting force causing the electromagnetic plunger to move are commensurate with each other. If the delivery pressure of the pump is 7 kg/cm$^2$ and the flow rate of a fluid delivered by the pump is 5400 cc per hour as aforesaid, the electromagnetic plunger moves in reciprocatory movement in a position which is about 2.8 mm lower than the balanced position or in a position in which its lower end is substantially flush with the upper end of the annular magnetic pole 4, with a stroke of about 2 mm or 1 mm above this position and 1 mm below this position. If this phenomenon is observed in FIG. 10, the load of the composite spring of about 1500 g at a point Q" which is removed by about 2.8 mm from point O' toward point Q' is an average load. In actual practice, the composite spring operates at this time to expand and contract with a load in the range between 1000 and 2000 grams.

The delivery plunger 6 has a cross-sectional area of 0.2 cm$^2$, so that it can withstand the pressure of 7 kg/cm$^2$. It will be quite natural that the magnetic attracting force for keeping the delivery pressure at 7 kg/cm$^2$ should be an attracting force which is higher than the aforesaid load of the spring, when the frictional resistances offered by various sliding parts of the pump, the flow resistance offered to the fluid, the efficiency of the valves, and a leaking of the fluid from between the delivery plunger and the cylinder are taken into consideration.

The so-called solenoid attracting force acting between the electromagnetic plunger and the electromagnetic coil will be described. When the electromagnetic plunger enters the electromagnetic coil, the former is saturated. Immediately before the electromagnetic plunger comes under the influence of the magnetic flux of the coil and when the magnetically neutral point of the coil coincides with that of the plunger or when lb=0, the attracting force becomes zero. It is a very complicated process to determine the magnetic attracting force accurately, because changes are caused to occur in such force not only by changes in ampere turn but also by the shape and dimensions of the coil, and the length and magnetic flux density of the plunger. In the present invention, the electromagnetic plunger is smaller in length than the electromagnetic coil, but the length of the electromagnetic plunger plus the length of the annular magnetic path 3 and annular magnetic pole 4 is larger than that of the electromagnetic coil. In actual practice, the solenoid attracting force can be obtained by the following experimental formula:

$$Fs = CS(NI/l)$$

where
S: cross-sectional area (cm²) of the electromagnetic plunger
I: current (A) flowing to coil
N: number of turns of coil
l1: length (cm) of coil
C: constant $(1.6 \sim 1.9)10^{-3}$ (which may be $C=7\times 10^{-3}$ for practical use)
Fs: solenoid attracting force $kg_{wt}$ The maximum attracting force of a saturated electromagnetic plunger is in direct proportion to a current. If the magnetic flux density of the electromagnetic plunger is disposed below the bend of the B-H curve, the constant C will change in direct proportion to the ampere turn, with a result that the attracting force will undergo a change at the rate of $(NI)^2$.

When the cylindrical electromagnetic plunger enters a coaxial cylindrical space such as the one formed by the annular magnetic pole 4 and the magnetic lines of force try to penetrate the electromagnetic plunger in a direction perpendicular to its side, the permeance of the gap can be expressed by the following relation:

$$P = \frac{\mu S'}{l} = \frac{\pi\mu(D + 2\delta)lc}{\delta}$$

Therefore $$\frac{dP}{dlc} = \frac{\pi\mu(D + 2\delta)}{\delta}$$

$$F_c = \frac{\pi}{2} U^2 \frac{\mu(D + 2\delta)}{\delta} \cdot \frac{1}{9.81}$$

where
P: permeance
$\mu$: $\approx \mu_0 = 4\pi \times 10^{-7}$ Wb/AT.m
S': area (m²) of annular magnetic pole overlapping electromagnetic plunger
D: diameter (m) of electromagnetic plunger
lc: length of electromagnetic plunger overlapping annular magnetic pole
$\delta$: magnetic gap between electromagnetic plunger and annular magnetic pole
U: magnetomotive force NI ampere turn
$F_c$: attracting force kg-wt That is, the attracting force $F_c$ acts in a direction in which lc increases, and the electromagnetic plunger is pulled into the annular magnetic pole. However, in this electromagnetic plunger pump, the lower end portion of the electromagnetic plunger 1 is pulled slightly downwardly of the upper end of the annular magnetic pole, and the electromagnetic plunger operates in a bottom dead center range of lc<1 mm, irrespective of whether the pressure for delivering a fluid under pressure is nearly zero or the delivery pressure rises to a level in the vicinity of 7 kg/cm². The electromagnetic plunger is not pulled more deeply into the annular magnetic pole than the above range.

As shown in FIGS. 11-a and 11-b, the operating positions of the electromagnetic plunger 1 in the plunger case 8 and the operating forces of the plunger 1 were measured by removing the restoring spring 10 and auxiliary spring 9 and the delivery plunger 6 of this pump. When a half-wave rectified current of 50 Hz and 100 V was passed to the electromagnetic coil 21 and no fluid was introduced into the pump, the electromagnetic plunger 1 moved in vibratory movement of very low intensity or remained substantially stationary in a position of lc$\approx$4 mm. When the electromagnetic plunger 1 was disposed on the right in FIG. 11-a, it moved leftwardly. If the pump was located vertically as shown in FIG. 3, the electromagnetic plunger 1 disposed in the lower portion moved upwardly. In any case, the plunger moved in vibratory movement of very low intensity or remained substantially stationary at the position of lc$\approx$4 mm. When the electromagnetic plunger 1 was located on the left side, it moved rightwardly due to the suddenly increased magnetic attracting force and moved in vibratory movement of very low intensity at the position of lc$\approx$4 mm. The vibratory movement of very low intensity of the electromagnetic plunger was not recognizable with the naked eye and the electromagnetic plunger looked as if it remained stationary. However, the electromagnetic plunger 1 was judged to be moving in vibratory movement of low intensity because a slight vibratory sound was produced by a nonmagnetic metallic rod applied to the electromagnetic plunger 1.

From the foregoing, it will be seen that the operating position and the length of the stroke of the electromagnetic plunger show changes depending on the condition in which it is balanced by the restoring spring and auxiliary spring, the presence or absence of such springs and the pressure and flow rate of the delivered fluid, even if the current passed to the electromagnetic coil is a half-wave rectified current of the same value. Therefore, if the pump is to put to practical use, the relation between the magnetic attracting force and the load of the composite spring must be determined in such a manner that the end of the stroke of the electromagnetic plunger 1 or the bottom dead center thereof is disposed in a position in which the value of lc is less than 1 mm.

It appears that the resilient forces of the springs act in a manner to apply the brake to the attracting force Fc which acts to increase the overlapping portions of the electromagnetic plunger 1 and the annular magnetic pole 4 or the value of lc.

In the present invention, the electromagnetic plunger 1 has a lower end portion which is formed as a projecting annular rim, and the annular magnetic pole 4 is also formed to have a projecting annular rim. Thus the magnetic flux tends to flow from the edge of the lower end of the electromagnetic plunger 1 toward the annular magnetic pole 4, and the electromagnetic plunger operates with a high degree of efficiency because there is little leakage of magnetic flux. The space designated by 1a which is disposed between the lower end of the electromagnetic plunger 1 and the upper end of the annular magnetic pole 4 and aligned with the center axis of the electromagnetic coil 21 can be considered as a magnetic gap.

Generally, the attracting force acting in the gap in a device having a magnetic pole or magnetic head provided for an electromagnetic plunger can be expressed by the following experimental formula:

$$F_G = 100 B^2 / 2\mu \cdot S / 9.81$$

where
$\mu$: $4\pi \times 10^{-7}$ Henry/m $= 4\pi \times 10^{-9}$ Henry/cm
B: magnetic flux density Weber/cm²
S: cross-sectional area of iron core cm²
$F_G$: attracting force acting in gap kgwt The value of B can be calculated on the basis of the ampere turn of the electromagnetic coil and the dimensions of the magnetic path. If the reluctance of the yoke or the return magnetic path and the leakage therefrom are neglected, the following relation can be obtained:

$$B = 1.25(NI/la) \times 10^{-8}$$

When the magnetic path is not saturated, $F_G$ can be written as follows from the aforesaid two formulas:

$$F_G = 6.35 \times 10^{-8} \, S'' \, (NI/la)^2$$

$S''$ is the effective area of the end face of the annular rim on the lower end of the electromagnetic plunger.

In the case of an AC electromagnetic coil, the reactance of the electromagnetic device is reduced as the magnetic gap increases in size due to the movement of the electromagnetic plunger, thereby greatly increasing the value of an energizing current. Meanwhile, the value of the energizing current is greatly reduced as the gap becomes smaller in size. On the other hand, in the case of a DC electromagnetic coil, a current passed to the electromagnetic coil is not affected by changes in the size of the gap. In carrying out experiments in the embodiment of invention, an Ac current was used after being subjected to half-wave rectification and the current used is a DC current. Therefore, as shown in FIG. 4 and Table 1, there are very small changes in the value of a current passed to the electromagnetic coil caused by variations in the operating position of the electromagnetic plunger or changes in the size of the gap la. The ampere turn can be calculated by using the values read on a DC ammeter during the operation of the pump. However, when an electric circuit and a magnetic circuit extend through each other as in the case in which a half-wave rectified current is used to energize an electromagnetic coil which is an electromagnet to actuate an electromagnetic plunger, the current for the electric circuit utilizes the upper half portion of the alternating current cycle which changes with time, so that the magnetic flux produced in the magnetic circuit by the magnetomotive force of such current undergoes a change with a change in the current. Because of this, a self-inductance phenomenon occurs in which an electromotive force reversed in direction or a counter electromotive force is induced in the electric circuit. Thus an electromotive force opposite to the change of current in the electric circuit is induced. Accordingly, when the current increases in value, an electromotive force opposite to the direction of the current is induced so as to thereby prevent the increase of current, and when the current is reduced in value, an electromotive force of the same direction as the current is induced so as to thereby prevent the reduction of current. The electromotive force e induced by self-inductance is proportional to a change in the ratio of the current i (A) to time t (second). That is, this relation can be written as follows:

$$e = -L(di/dt) \, (V)$$

where L represents self-inductance expressed in Henry and is a proportional constant. If a change in the interlinked magnetic flux relative to a change in the current di is expressed by $d\phi$, then $$d\phi = Ldi \quad L = d\phi/di.$$

As described above, the magnetic attracting force acting in the electromagnetic plunger pump according to this invention represents a composite of positive magnetic forces Fs, Fc and $F_G$ referred to above, and is influenced by the aforesaid self-inductance voltage. Moreover, a magnetic force F'c of the reverse direction is produced between the upper end of the electromagnetic plunger 1 and the annular magnetic path 3, and a magnetic force F's of the reverse direction is produced when the value of lb becomes negative or when the central point of the electromagnetic plunger 1 passes the center or magnetically neutral point of the electromagnetic coil 21 while the electromagnetic plunger 1 is operating. Therefore, the composite of these negative magnetic forces must be deducted from the composite of the positive magnetic forces, making the situation complex. In addition, the composite magnetic attracting force varies due to the shape of the magnetic path as a whole, the gap, the magnetic permeability, and the relative positions of the electromagnetic plunger and the electromagnetic coil. Thus great difficulties are encountered in calculating the composite magnetic attracting force of the electromagnetic plunger 1 in each of the operating positions thereof. FIG. 11-b referred to above shows the values of the operating force F (g-wt) of the electromagnetic plunger 1 measured actually in various positions in the magnetic path or plunger case 8. In FIG. 11, the positions of the electromagnetic plunger 1 are set forth along the horizontal axis and the values of the attracting force are set forth along the vertical axis. In this graph, it will be seen that the operating force of the electromagnetic plunger 1 rapidly increases as the left end thereof in FIG. 11-a (corresponding to the upper end in FIG. 3) has completely entered the electromagnetic coil 21 and rapidly decreases as the right end thereof (corresponding to the lower end in FIG. 3) passes a position in which it coincides with the upper end of the annular magnetic pole or la=0 and lc=0. When the electromagnetic plunger 1 reaches a position in which its magnetically neutral point has passsed the magnetically neutral point of the electromagnetic coil 21 and in which the right end of the electromagnetic plunger 1 enters the annular magnetic pole 4 about 4 mm or lc≈4 mm, the composite magnetic attracting force of the positive forces Fs, Fc and $F_G$ and the composite attracting force of the negative forces F's and F'c are in equilibrium and the electromagnetic plunger 1 becomes nearly stationary. It appears that the electromagnetic plunger 1 moves in vibratory movement of a low intensity due to intermittent passing thereto of a half-wave rectified current and a change in di/dt thereof.

In FIG. 11-b, a solid line curve, a broken line curve and a dash-and-dot line curve indicate magnetic attracting forces exerted when an AC current of 50 Hz and 100 V, an AC current of 50 Hz and 85 V and AC current of 50 Hz and 115 V were half-way rectified. Previously, it has been explained that when the pump was set at a delivery pressure 7 kg/cm² and used for ejecting a liquid under pressure in atomized particles at the rate of 1.5 gallons per hour, the operating positions of the electromagnetic plunger 1 were such that it moved with an amplitude of within 1 mm upwardly and downwardly of the position of la≈0 in whch the lower end of the plunger coincided with the upper end of the annular magnetic pole 4. That is lc<±1 mm. Assume that lc=±1 mm/ or the electromagnetic plunger 1 operates with a stroke of 2 mm and the speed of the electromagnetic plunger changes from the initial velocity of $V_o = 0$ to the maximum velocity of $V_1$ during the time la=1 mm becomes la=0 mm and changes from the maximum velocity to the terminating velocity $V_2=0$ during the time $lc=0$ becomes $lc=+1$ mm. Assume also that the time $t_1$ for the velocity to change from $V_o$ to $V_1$ is equal to the time $t_2$ for the velocity to change from $V_1$ to $V_2$. Since an AC current of 50 Hz is subjected to half-wave rectification and passed to the pump, $t_1=t_2=1/50\times\frac{1}{2}\times\frac{1}{2}\times 1/200$ second.

Therefore, $$V_1^2 = V_o^2 + 2\alpha S \quad V_o = V_2 = 0$$
$$V_o^2 = V_1^2 + 2\alpha' S \quad S = S' = 1\text{mm}$$
$$S = \alpha/2 t^2 = \alpha/2 (1/200)^2$$
$$\alpha = 80\text{m/sec}^2 \quad \alpha' = -80\text{m/sec}^2$$
$$V_1 = \sqrt{2\alpha S} = \sqrt{0.16}\text{m/sec}$$

If the weight of the electromagnetic plunger is assumed to be 20 g, the force f for moving the plunger will be $f=(W/g)\alpha=0.16$ kg, and a magnetic attracting force corresponding to the force f plus the sum of forces wasted as losses by the sliding frictional resistance offered to the moving parts of the pump and the flow resistance offered to the fluid and a force required for producing a delivery pressure of the pump will be required for operating the pump to obtain the required delivery pressure. If the delivery pressure of the pump is 7 kg/cm² and the diameter of the plunger 6 is 5 mm, the force required to produce this delivery pressure must at least be over $7\times(\pi/4)0.5^2\approx 1.4$ kg. It is to be understood that the aforementioned magnetic attracting force should have a value which includes losses wasted as aforementioned or a value which is obtained by dividing the force with the efficiency of the pump. In the present invention, however, the restoring spring 10 and the auxiliary spring 9 have what is referred to as a spring hammering action wherein the springs absorb the inertial energy of the electromagnetic plunger 1 when it reaches the bottom dead center and the top dead center at the terminating points of its reciprocatory movement and then release the absorbed energy by the resilience of the springs. Thus the fluid in the pump is pressurized instantaneously, so that resonance is created between the reciprocatory movement of the electromagnetic and delivery plungers and the biasing forces of the spring and the output of the pump is increased.

This is supported by the aforementioned result of experiments that when the nozzle at the outlet end of the pump was removed and the outlet end was opened or when the resistance offered to the flow of the fluid at the outlet end of the pump was reduced, the operating position of the electromagnetic plunger 1 underwent a change in such a manner that the top dead center of the return stroke thereof moved upwardly by about 1 mm from the position in which the plunger remained stationary by virtue of the biasing forces of the springs 9 and 10.

In the case of the pump according to the invention, when the delivery plunger 6 compresses the fluid within the cylinder 7 and forces same out of the check valve 15 on the delivery side into the plunger case 8 through the conduit 13 in its advancing stroke or when the electromagnetic plunger 1 is attracted toward the annular magnetic pole 4 by the magnetic attracting force, the volume of the plunger case 8 is reduced by an amount equal to the amount by which the delivery plunger 6 enters the cylinder 7. The volume displaced by the delivery plunger 6 entering the cylinder 7 is introduced into the plunger case 8, so that the fluid merely moves within the pump and is not delivered from the pump through the outlet or the delivery joint 31. When the magnetic attracting force disappears, the suction and delivery actions of the pumps are simultaneously performed in the return stroke of the delivery plunger 6 which is made possible by the biasing force of the restoring spring 10. In short, it can be concluded that the delivery pressure of the pump is determined by the elastic restoring force of a composite spring load of the restoring spring 10 and the auxiliary spring 9, and that the magnetic attracting force has only to have an intensity such that it increases the deflections of the springs until an elastic restoring force is produced to provide a predetermined delivery pressure or a predetermined composite spring load and the deflections of the springs match the aforesaid overall magnetic attracting force with respect to the position of the electromagnetic plunger.

In the embodiment shown in FIG. 3, the suction and discharge actions of the pump are described with reference to a case in which a fluid is discharged on the delivery side through the check valve 15, conduit 13, plunger case 8 and delivery joint 31. Even if the delivery joint 31 is closed and the accumulator 35 is removed to discharge the fluid through an opening in the main body 11 opposite to the suction port 19, the delivery plunger 6 of this pump performs the same suction and discharge operations so long as the plunger case 8 is maintained in communication with the check valve 15 on the delivery side. In the event that the conduit 13 is not connected with the check valve 15 on the delivery side, a fluid delivery operation is performed in a so-called advancing stroke in which the electromagnetic plunger 1 is attracted by the magnetic attracting force toward the annular magnetic pole 4 or the delivery plunger 6 enters the cylinder 7, and a suction operation is performed in a return stroke in which the delivery plunger 6 is restored to its original position by the elastic restoring force of the restoring spring 10.

The elastic restoring force of the restoring spring 10 is not utilized in the delivery stroke and the spring 10 functions only in the suction stroke. However, the resilience of the restoring spring 10 should match the magnetic attracting force in the delivery stroke and should be synchronous with the number of pulses impressed on the electromagnetic plunger 21 or the number of strokes of the electromagnetic plunger 1. Therefore, the restoring spring 10 must have a high spring constant. It has been ascertained as the results of experiments that a spring of the same specifications as the spring shown in FIG. 3 can be used in this invention.

The relation between the positions of the electromagnetic plunger 1 in the plunger case 8 and the operating attracting forces will be explained in detail by referring to FIG. 11-a and FIG. 11-b. In FIG. 11-b, the distance ld mm covered by the movement of the right end of the electromagnetic plunger (the lower end in the case of FIG. 3) is set forth along the horizontal axis, and a magnetic attracting force F gwt actually measured at each point of movement is set forth along the vertical axis. A solid line curve, a broken line curve and a dash-and-dot line curve represent an application of an AC current of 50 Hz and 100 V, an application of an AC current of 50 Hz and 85 V and an application of an AC current of 50 Hz and 115 V to the electromagnetic coil 21 after subjecting the current to half-wave rectification. In this connection, it has been stated previously that when the current is of 100 V, the electromagnetic plunger 1 stops in a position $lc\approx 4$ mm in which the composite magnetic attracting force which consists of the solenoid attracting force exerted when lb′=0 or the magnetically neutral point of the electromagnetic plunger 1 coincides with the magnetically neutral point of the electromagnetic coil 21 along the vertical axis thereof and the attracting force acting in the gap in a direction in which the distance between the right end of the electromagnetic plunger 1 and the left end of the annular magnetic pole 4 becomes zero or la′=0 and the value of lc increases with the entrance into the annular magnetic pole 4 of the right end portion of the electromagnetic plunger 1 matches the composite magnetic attracting force acting in a direction opposite to the direction in which the aforesaid composite magnetic attracting force acts or the composite magnetic attracting force consisting of the attracting force acting in the gap between the electromagnetic plunger 1 and the annular magnetic path 3 and the solenoid attracting force acting in such a manner that lb′<0. When the current is of 85 V, the electromagnetic plunger stops in a position lc=5 mm; when the current is of 115 V, the plunger 1 stops in a position lc=3 mm. It has been ascertained that the distance ld in which the electromagnetic plunger 1 can be caused to operate from left to right (upwardly in FIG. 3) in FIG. 11-a by the composite magnetic attracting force is about 18 mm when the current is of 100 V. It is because of the construction of the magnetic path in which the equilibrium point of the positive and negative magnetic attracting forces moves leftwardly in FIG. 11-a that the higher the voltage impressed on the electromagnetic coil 21, the smaller becomes the value of lc.

The point in which the right end of the electromagnetic plunger 1 coincides with the left end of the annular magnetic pole 4 or la′=0 and lc=0 will be designated by Q″.

When the pump was assembled as shown in FIG. 3 and actuated by passing thereto a half-wave rectified AC current of 50 Hz and 100 V to eject a fluid through a nozzle at the rate of 1.5 gallons per hour at the delivery pressure of 7 kg/cm², the electromagnetic plunger 1 remained stationary in a position in which the distance between the lower end of the plunger 1 and the upper end of the annular magnetic pole 4 was la≈2.8 mm as described previously. The straight line shown in FIG. 10 as representing the composite spring deflection-load characteristic was described in FIG. 11-b as a line $O'_A$—$P'_A$ passing a point $O'_A$ (See point A in FIG. 4) which disposed leftwardly of the point Q″ and representing la=2.8 mm. It has been found that the intersections of this straight line and broken line curve, solid curve and dash-and-dot line curve are disposed near a position which has a magnetic attracting power of lc=1 mm substantially at the bottom dead point of the stroke of the electromagnetic plunger 1. This proves that if a half-wave rectified current is passed to the electromagnetic plunger 21 in such a manner that there are substantially no difference in the forces actuating the electromagnetic plunger 1 in spite of the fact that there are variations in voltage of 85 V, 100 V and 115 V and if the sum of the deflections of the restoring spring 10 and the auxiliary spring 9 is adjusted so that the deflection of the composite spring and the load applied thereto match the magnetic attracting force actuating the electromagnetic plunger 1, then there is provided an electromagnetic plunger pump which has a stable voltage-delivery pressure characteristic.

In the embodiment shown and described hereinabove, the invention has been described as using a current of 50 Hz. However, it has been ascertained experimentarily that the voltage-delivery pressure characteristic of an electromagnetic plunger pump can be stabilized under the same conditions except that the electromagnetic coil connection has to be changed to a connection for exclusive use of 60 Hz.

In FIG. 11-b, a point $O'_B$ (See point B in FIG. 4) representing la=5.5 mm was written on the extension of the line Q″—$O'_B$, and the relation between a composite spring deflection-load characteristic line $O'_B$—$P'_B$ passing the point $O'_B$ and the actuating force curves for the electromagnetic plunger 1 shown as dot-and-line, broken line and solid line curves was studied. It has been found that the intersections of the spring deflection-load characteristic line and the curves are greatly separated from one another and are not disposed near one point as is the case with the line passing $O'_A$. This shows that changes in delivery voltage relative to changes in the voltage applied to the electomagnetic coil 21 become greater as the balancing point of the electromagnetic plunger 1 at the time of its being stationary is moved. This explains the same phenomenon as explained by comparing the curves $P_A$ and $P_B$ in FIG. 5.

In FIG. 4, the point A is a point at which the delivery pressure of the pump is set at 7 kg/cm² at which the voltage-delivery pressure characteristics is stablized, which point can be reached if the sum of deflections of the auxiliary spring 9 and the restoring spring 10 are increased to reduce the distances la and lb and lower the delivery pressure of the pump. In the same figure, the point B is a point at which delivery pressure is set at the same level as the point A by increasing the distances la and lb by reducing the sum of deflections of the two springs but at which the delivery pressure changes linnearly with respect to changes in voltage. In the present invention, it is quite natural that the point A should be selected as an adjusted point because the invention aims at stabilizing the voltage-delivery pressure characteristic.

When the point A is selected as an adjusted point, this point appears to indicate a condition of saturation in the B—H curve representing the magnetic flux density and the magnetomotive force as indicated by the $P_A$ curve in FIG. 5 and as shown in FIGS. 6 and 8. However, it will be evident from the explanation of the $P_B$ curve in FIG. 5 that the phenomenon is not due to magnetic saturation. This will be evident from the description of the $P_B$ curve in FIG. 5. As described with reference to FIG. 11-b, it is possible to substantially stabilize the delivery pressure of the pump if the magnetic attracting force exerted on the electromagnetic plunger 1 at the bottom dead center of the stroke thereof is set such that it matches the load applied by the deflection of the composite spring, so long as changes in the values of the voltage impressed on the electromagnetic coil 21 are confined to a predetermined range. It is due to the magnetic attracting force of Fc that the magnetic attracting force for each voltage shows a rise in the position la=0.

Table 1 will be explained by referring to the graphs shown in FIG. 4 and FIG. 11-b. Table 1 shows the deflection ($h_1$-$h'_1$) of the auxiliary spring 9 and the deflection ($h_2$-$h'_2$) of the restoring spring 10 calculated on the basis of the values of a, c′ and c, and the values of la and lb obtained as described above and ascertained by means of the position of the indicator 37. Experiments were carried out by passing a half-wave rectified AC current of 50 Hz and 100 V to the electromagnetic coil 21 and attaching a spray nozzle of the delivery capacity of 1.5 gallons per hour to the delivery end of the pump, in order to establish the relation between the aforementioned values and the values of the delivery pressure. The ratio la/lb was also calculated and shown in Table 1. Different values of the current shown in Table 1 indicate that the current of these different values was passed to the electromagnetic coil 21 when the values of delivery pressure of the pump were varied. Thus, experiments were also carried out by closing the delivery end of the pump. In this case, the values of the internal pressure of the pump and the current passed to the electromagnetic coil 21 are also shown in the table. By assuming that the electromagnetic plunger 1 remains stationary at the aforementioned balancing point when the delivery end of the pump is closed, changes in the values of the current were obtained with respect to changes in the distance lb between the magnetically neutral points of the electromagnetic plunger 1 and electromagnetic coil 21 and the distance la between the upper end of the annular magnetic pole 4 and the lower end of the electromagnetic plunger 1. As can be seen in the table, the changes are slightly larger in the latter than in the former, but the differences are very small. Particularly, in the range of values in which the voltage-delivery pressure characteristic is stabilized, the differences are within 1%. The stability of the voltage-delivery pressure characteristic is indicated by the symbol ○ when the values of delivery pressure were substantially stable as shown by the curve $P_A$ in FIG. 5 and other curves in FIGS. 6 and 8 in the range of values of the voltage of 100 V ±15 V. The stability is indicated by the symbol △ when there were linear changes in the voltage-delivery pressure characteristic when the voltage varied to 85 V and 115 V. The stability is indicated by the symbol X when the voltage-delivery pressure characteristics showed a linear rise like the $P_B$ curve in FIG. 5 or the straight line shown in FIG. 1.

In Table 1, it will be seen that in embodiments wherein the delivery pressure is relatively stable with respect to changes of about ±15% in the predetermined voltage of 100 V (the embodiments indicated by the symbol ○) when the adjusting rod is rotated to change and set the delivery pressure at different levels of value in a pump in which a nozzle of the delivery capacity of 1.5 gallons per hour (at the delivery pressure of 7 kg/cm$^2$) is attached to the delivery end of the pump, the ratio la/lb is substantially in the range between 0.75 and 0.3.

The voltage-delivery pressure characteristic described hereinabove according to the invention has been obtained when the pump had a nozzle of the delivery capacity of 1.5 gallons per hour attached to its delivery end. A study of the characteristic of the pump by referring to Table 1 will readily show that if the flow rate of a delivered fluid is reduced or a nozzle of a lower capacity is attached to the delivery end of the pump, the ratio la/lb will become lower than 0.3. For example, if a nozzle of the delivery capacity of 0.4 gallon per hour is attached to the pump, the ratio of the quantity of the fluid and the length of the stroke of the delivery plunger will be 0.4/1.5≈0.27 as compared with a pump having a nozzle of the delivery capacity of 1.5 gallons per hour.

If the pump is used with a so-called gun pot burner which requires a delivery pressure of only 3 kg/cm$^2$, the ratio la/lb≈0.114 as roughly calculated on the basis of Table 1. Thus the pump can be put to practical use even when la/lb≈0.1 if the characteristics of this pump shown in various graphs are taken into consideration, provided that the power source used is such that variations in the values of voltage remain ±10%.

If it is desired to increase the quantity of a fluid delivered by the pump or if a nozzle of the delivery capacity of 3 gallons per hour is required, the length of the stroke of the plunger will become twice as large as when a nozzle of the delivery capacity of 1.5 gallons per hour is used as explained with reference to the embodiment shown and described hereinabove. When this is the case, it is possible to obtain a desired delivery pressure and flow rate of the fluid if the values of la and lb are varied greatly by adjusting the adjusting rod. However, it will be nautral that the voltage-delivery pressure characteristic of the pump is reduced than when a nozzle of 1.5 gallon capacity is used, if the pump is designed such that its output characteristic is tight.

When it is desired to further increase the quantity of a fluid delivered by the pump and its delivery pressure or when a pump of a higher capacity is required, it is necessary to increase the ampere turn and to increase the size of the electromagnetic coil accordingly so as to increase the output of the pump. It is natural that the specifications should be changed in such a manner that the size, shape and magnetic characteristic of the electromagnetic plunger and delivery plunger, the annular magnetic path, the annular magnetic pole and the yoke surrounding them, and the dimensions of the restoring spring and auxiliary spring are altered rationally so that all the parts balance. If a delivery plunger of the same diameter as the delivery plunger used with a pump of the delivery capacity of 1.5 gallons per hour is used when the delivery capability of 5 gallons per hour is needed, the length of stroke of the plunger will be 5/1.5≈3.34 times as great as that of the plunger of the pump of the delivery capacity of 1.5 gallons per hour, resulting in an increase in the values of la and lb. In this case, the value of the ratio la/lb becomes close to 1, but $lb - la = \alpha$ wherein $\alpha$ is positive and constant.

It will be readily appreciated that there will be provided a pump in which voltage-delivery pressure characteristic is substantially stable and no problem is encountered in putting it to practical use even though the value of the ratio la/lb further becomes close to 1, if the pump is used with the aforementioned gun pot burner of the special type and under the condition in which the power source system is stable or variations in the voltage of the power source are in the range between ±10% and ±5%.

As aforementioned, the pump according to the invention is required to meet the requirement of 0.1<la/lb<1 in order that the delivery pressure thereof may be stabilized despite changes in voltage.

When it is desired to increase the delivery pressure of the pump, it is necessary to increase its output. This makes it necessary to replace the old parts by new parts as aforementioned. However, the value of the ratio la/lb should remain within the aforesaid range.

In the samples of the pump indicated by the symbol ○ of the stable voltage-delivery pressure characteristic, a reduction in the values of la and lb caused by an increase in the deflections of the auxiliary spring 9 and the restoring spring 10 to move the electromagnetic plunger 1 toward the annular magnetic pole 4 results in a reduction in delivery pressure. Conversely, an increase in the values of la and lb results in an increase in delivery pressure. In FIG. 4, the left side of the pressure curve including point A as seen from the highest point of the curve represents this characteristic, while the right side thereof including point B represents a characteristic which is opposite to this characteristic as explained by referring to FIG. 5 and Table 1. Also, it will be clearly seen that in FIG. 11-b, a reduction in the value of la results in a reduction in delivery pressure but the voltage-delivery pressure characteristic is stable on the right side of the projecting central portions of the curves representing the magnetic attracting force disposed substantially midway between the two straight lines $O'_B$-$P'_B$ and $O'_A$-$P'_A$, but a reduction in the value of la results in an increase in delivery pressure and the voltage-delivery pressure characteristic changes linearly on the left side of the projecting central portions of the curves representing the magnetic attracting force.

The construction of the electromagnetic plunger pump having a voltage-delivery pressure characteristic which is stable as aforesaid will be further described with reference to FIGS. 3 and 11-a. The magnetic flux leaking portion 40 interposed between the annular magnetic path on which the magnetic attracting force acts or the annular magnetic pole 4 in this embodiment and the annular magnetic path 3 disposed in spaced juxtaposed relation with the pole 4 is formed such that the major portion of the length $l_5$ thereof is disposed on the annular magnetic pole 4 side than on the annular magnetic path 3 side with respect to the magnetic neutral point of the electromagnetic coil 21. Stated differently, the distance between the upper end of the annular magnetic pole 4 and the magnetically neutral point of the electromagnetic plunger 21 is greater than the distance between the lower end of the annular magnetic path 3 and the magnetically neutral point of the magnetic plunger 21, so that the electromagnetic plunger 1 is fitted in the annular magnetic path 3 at all times during operation. Moreover, if a portion of the electromagnetic plunger 1 having a length $l_4$ which has a major cross-sectional area when cut at right angles to the axis of the plunger as shown in FIG. 11-a is fitted in the annular magnetic path 3 and substantially fills the magnetic flux leaking portion 40 so that a gap is provided between the end of the plunger 1 facing the magnetic pole 4 and the upper end of the magnetic pole 4, then the gap will function in such a manner that the magnetic flux is concentrated therein and the magnetic attracting force can achieve increased effect. The bore 34 extending axially through the electromagnetic plunger 1 may be plural in number and the bores may be disposed equidistantly on a circle concentric with the center axis of the plunger 1, or vertically extending grooves may be formed on the outer circumferential surface of the plunger 1 in place of the vertically extending bores, in order to permit a fluid in the plunger case 8 for the plunger 1 to flow therethrough and to reduce the resistance offered to the flow of the fluid. Alternatively, vertically extending bores and vertically extending grooves may be provided in combination with one another.

In the embodiment of the invention shown in FIG. 3, the balancing stationary position of the electromagnetic plunger 1 or the values of la and lb are adjusted by turning the adjusting rod 16 to adjust the deflections $(h_1-h'_1)$ and $(h_2-h'_2)$ of the auxiliary spring 9 and the restoring spring 10 respectively, so as to thereby set the pump at a desired delivery pressure. Alternatively, it is possible to effect adjustments, as described with reference to a plunger pump of the solenoid type serving concurrently as an electromagnetic valve disclosed in Japanese Patent Publication No. Sho 51-24726, by providing an adjusting thread on the outer circumferential surface of the annular magnetic path 3 or annular magnetic pole 4. The delivery joint 32 may be threadably connected to the threaded portion of the magnetic path 3 or the main body 11 may be threadably connected to the threaded portion of the magnetic pole 4, and the threaded portion may be turned to move the magnetic path 3 and magnetic pole 4 up and down so as to thereby adjust the values of la and lb to set the pump at a desired delivery pressure.

From Table 1, it can be seen that when the pump is set at the same delivery pressure and flow rate by turning the adjusting rod 16, the deflection $(h_1-h'_1)$ of the auxiliary spring 9 and the deflection $(h_2-h'_2)$ of the restoring spring 10 vary in such a manner that the values of la and lb are substantially constant regardless of the value of a.

Even if the sum of the deflections $(h_1-h'_1)$ and $(h_2-h'_2)$ varies, the ratio of the changes in the deflections of the two springs is in inverse proportion to the spring constants $K_1$ and $K_2$ of these springs at all times. Therefore, the deflection-load line of the composite spring starts at the balancing stationary point of the two springs and does not undergo a change. Thus, the features characteristic of the present invention are the values of la and lb and the ratio thereof, the shape and size of the magnetic paths, and the correlation between the composite magnetic attracting force produced when a current is passed to the electromagnetic coil and the composite spring load applied when the electromagnetic plunger is supported by the auxiliary spring and the restoring spring. By virtue of these features, it is possible to provide an electromagnetic plunger pump of simple construction, small size and high durability which is easy to maintain and stable in voltage-delivery pressure characteristic. The electromagnetic plunger pump provided has particular utility in supplying a fuel oil under pressure in atomized particles for a gun pot burner and can be used with hot water feeding equipment, heating equipment, drying equipment and many other types of equipment, thereby greatly contributing the development of industry.

What is claimed is:

1. In an electromagnetic plunger pump, particularly using a half-wave rectified current as a power source, comprising an electromagnetic coil, a plunger case mounted along the center axis of the winding on said electromagnetic coil, an annular magnetic path and an annular magnetic pole located at opposite ends of the center axis of the winding on the electromagnetic coil and arranged in spaced juxtaposed relation so as to form a magnetic flux leaking portion therebetween, an electromagnetic plunger fitted in said plunger case for sliding reciprocatory movement along the center axis thereof having one end portion received in said annular magnetic path at all times during operation and shutdown of the pump, and a delivery plunger arranged coaxially with and adjacent to the electromagnetic plunger, said electromagnetic plunger and said delivery plunger being balanced and maintained in pressing engagement with each other in the vicinity of the magnetic flux leading portion by the biasing forces of an auxiliary spring and a restoring spring, the improvement wherein said electromagnetic plunger and said delivery plunger cooperating with the electromagnetic plunger are balanced and maintained in pressing engagement with each other by the biasing forces of the auxiliary spring and the restoring spring in such a manner that when the electromagnetic plunger is moved toward the annular magnetic pole to increase the sum of the deflections of the two springs so that the distance lb between the center of the winding or the magnetically neutral point of the electromagnetic coil and the magnetically neutral point of the electromagnetic plunger along the center axis thereof and the distance la between the end of the annular magnetic pole which is disposed anteriorly of the electromagnetic plunger with respect to the operating direction of the latter when the electromagnetic coil is energized and the end of the annular magnetic pole disposed in spaced juxtaposed relation to the electromagnetic plunger may have a relation $0.1 < la/lb < 1$, the pump has a characteristic that its delivery pressure is reduced when the sum of the deflections of the two spring increases, whereby the delivery pressure of the pump can be stabilized in spite of a variation in the value of the pressure applied thereto.

2. An electromagnetic plunger pump as set forth in claim 1, wherein the delivery pressure and the flow rate of the pump can be variably adjusted when the sum of the deflections of the auxiliary spring and the restoring spring is adjusted.

3. An electromagnetic plunger pump as set forth in claim 1, wherein the delivery pressure of and the flow rate of fluid through the pump can be variably adjusted by adjusting the position of the electromagnetic coil along the center axis of the winding on said electromagnetic coil to thereby vary the value of lb.

4. An electromagnetic plunger pump as set forth in claim 1, wherein the delivery pressure of and the flow rate of fluid through the pump can be variably adjusted by adjusting the position of the annular magnetic pole along the center axis thereof to vary the value of la.

* * * * *